Patented Aug. 14, 1945

2,382,613

UNITED STATES PATENT OFFICE 2,382,613

PROCESS OF MAKING AROMATIC AMINES

Joseph B. Dickey, Edmund B. Towne, and William H. Strain, Rochester, N. Y., assignors to Eastman Kodak Company, Rochester, N. Y., a corporation of New Jersey No Drawing. Application November 30, 1943, Serial No. 512,336

5 Claims. (Cl. 260—580)

This invention relates to the manufacture of aromatic amines, and more particularly to the manufacture of substituted aromatic amines.

Certain meta-substituted aromatic amines, such, for instance, as m-toluidine,

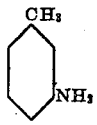

and cresidine,

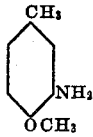

have been difficult or impossible to purchase in large quantities. Relatively small proportions of m-toluidine are formed as a by-product in the manufacture of ortho- and para-toluidine, and the supply is thus sharply limited by the demand for the ortho- and para-compounds. Cresidine has not been on the market in large quantities.

A number of attempts were made to reduce m-nitrobenzaldehyde to m-toluidine, using Raney nickel as a catalyst, and hydrogen under 100 atmospheres pressure, over a temperature range of 20-150° C. The yield of m-toluidine obtained was small. Some m-aminobenzyl alcohol was formed, together with large quantities of higher-boiling products.

We have discovered, however, that the acetals and the lower diakyl esters, such as the diacetates, of m-nitro aromatic aldehydes can be reduced directly to the corresponding m-amino, alkyl substituted aromatic hydrocarbons, by hydrogenating them in the presence of a hydrogenation catalyst, such, for instance, as nickel on diatomaceous earth, Raney nickel, copper chromite, copper zinc chromite, or other catalyst containing chromium, cobalt, copper, platinum, platinum oxide (Adams), molybdenum or palladium.

Adams' preparation of platinum oxide catalyst is described in Organic Syntheses, Collective volume I, pp. 463-470. The preparation of Raney nickel is described in U. S. Patent 1,563,587.

Acetates of m-nitrobenzaldehyde are described in Gazz. chim. ital. 36, II 266. Acetals of m-nitrobenzaldehyde are described in Berichte 31, 1010-19 (1898). The acetals of m-nitro aromatic aldehydes may be prepared by the method described in Organic Syntheses, Collective volume I, pages 1-2 for the preparation of acetals: namely, by adding the nitroaldehyde to chilled alcoholic calcium chloride.

To illustrate the preparation of m-toluidine according to our invention, we give the following examples:

*Example 1.*—197 g. (1 gram-mole) of m-nitrobenzaldehyde dimethylal was charged into an autoclave with 10 g. of Raney nickel and hydrogenated at 120 atmospheres pressure and a temperature of 80-90° C. until 3 gram-moles of hydrogen were absorbed. The temperature was then raised to 120-130° C. for 10 hours, after which the bomb was cooled and the products were removed and fractionated. A 30% yield of m-toluidine was obtained.

*Example 2.*—131 g. of m-nitrobenzaldiacetate, mixed with 54 g. of m-toluidine, was hydrogenated in a shaking autoclave over 10 g. of Raney nickel at 80° C. and 110 atmospheres hydrogen pressure. At the end of ½ hr. the temperature was slowly raised to 120-130° C. When 2½ gram-moles of hydrogen had been taken up, the reaction was stopped and the product worked up. A nearly quantitative yield of acetyl-m-toluidine was obtained. This product was hydrolyzed by warming with dilute hydrochloric acid, the solution was neutralized with alkali, and the m-toluidine was isolated by steam distillation.

Cresidine may be prepared by hydrogenating an acetal or diester of nitroanisaldehyde. While the preparation of these starting materials forms no part of our invention, it may be briefly described. Phenol is methylated, by means of methyl chloride or dimethyl sulfate in the presence of sodium hydroxide, to form anisole. Anisole, treated with carbon monoxide in the presence of a suitable catalyst, such as aluminium chloride and cuprous cyanide, gives anisaldehyde. Nitration of anisaldehyde gives 3-nitro-4-methoxybenzaldehyde as the principal product. 3-nitro-4-methoxybenzaldehyde is converted into the acetal or the diacetate as described above.

The following examples are illustrative of the preparation of cresidine according to our invention.

*Example 3.*—227 g. (1 gram-mole) of 3-nitro-4-methoxybenzaldehyde dimethylal was charged into an autoclave with 10 g. of Raney nickel catalyst and hydrogenated at 120 atmospheres pressure at about 90° C. until 3 gram-moles of hydrogen were absorbed. The temperature was then raised to 120-130° C. for 10 hours with the same hydrogen pressure. The bomb was cooled and the products were removed and fractionated. About 30% of cresidine, 50% of 3-amino-4-methoxy benzyl alcohol, and some 3'-amino-4'-methoxybenzyl-2-methoxy-5-hydroxymethyl - aniline,

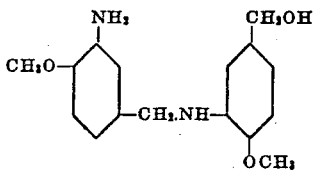

were obtained.

*Example 4.*—283 g. (1 gram-mole) of 3-nitro-4-methoxybenzaldiacetate was placed in a shaking autoclave with 10 g. of Raney nickel and hydrogenated at 110 atmospheres pressure at about 90° C. until 3 moles of hydrogen were absorbed. The temperature was then raised to 120–130° C. for 10 hours under 110 atmospheres of hydrogen pressure. Upon working up, an excellent yield of N-acetyl cresidine was obtained. Cresidine was obtained from this product by hydrolysis with dilute HCl, neutralization with alkali and steam distillation.

What we claim as our invention and desire to be secured by Letters Patent of the United States is:

1. Process for the preparation of a meta-substituted aromatic amine, comprising catalytic hydrogenation of a compound selected from the group consisting of the acetals and lower dialkyl esters of a meta-nitro aromatic aldehyde.

2. Process for the preparation of a meta-substituted aromatic amine, comprising catalytic hydrogenation, under pressure, in the presence of a nickel catalyst, of a compound selected from the group consisting of the acetals and lower dialkyl esters of a meta-nitro aromatic aldehyde.

3. Process for the preparation of m-toluidine, comprising catalytic hydrogenation of an acetal of m-nitrobenzaldehyde.

4. Process for the preparation of cresidine, comprising catalytic hydrogenation of an acetal of 3-nitro-4-methoxybenzaldehyde.

5. Process for the preparation of cresidine, comprising catalytic hydrogenation of a lower dialkyl ester of 3-nitro-4-methoxybenzaldehyde.

JOSEPH B. DICKEY.
EDMUND B. TOWNE.
WILLIAM H. STRAIN.